United States Patent
Shimomura et al.

(10) Patent No.: US 8,146,348 B2
(45) Date of Patent: Apr. 3, 2012

(54) EXHAUST EMISSION CONTROL DEVICE

(75) Inventors: Osamu Shimomura, Okazaki (JP); Ataru Ichikawa, Kariya (JP)

(73) Assignee: Denso Corporation, Kariya (JP)

( * ) Notice: Subject to any disclaimer, the term of this patent is extended or adjusted under 35 U.S.C. 154(b) by 646 days.

(21) Appl. No.: 12/274,698

(22) Filed: Nov. 20, 2008

(65) Prior Publication Data

US 2009/0126350 A1 May 21, 2009

(30) Foreign Application Priority Data

Nov. 21, 2007 (JP) ................................ 2007-301770

(51) Int. Cl.
*F01N 3/00* (2006.01)
(52) U.S. Cl. .......................................... 60/286; 60/277
(58) Field of Classification Search .................... 60/286, 60/277
See application file for complete search history.

(56) References Cited

U.S. PATENT DOCUMENTS

| | | | |
|---|---|---|---|
| 6,148,612 A * | 11/2000 | Yamashita et al. | 60/277 |
| 6,367,320 B1 * | 4/2002 | Kueper et al. | 73/114.71 |
| 6,959,540 B2 | 11/2005 | Itoh et al. | |
| 7,086,222 B2 | 8/2006 | Itoh et al. | |
| 7,086,223 B2 | 8/2006 | Itoh et al. | |
| 7,272,924 B2 | 9/2007 | Itoh et al. | |
| 2005/0144933 A1 * | 7/2005 | Enoki | 60/277 |
| 2007/0193253 A1 * | 8/2007 | Tsumagari | 60/286 |
| 2009/0049899 A1 | 2/2009 | Hjorsberg et al. | |

FOREIGN PATENT DOCUMENTS

| | | |
|---|---|---|
| JP | 10-259714 | 9/1998 |
| JP | 2003-293739 | 10/2003 |
| JP | 2006170092 A * | 6/2006 |

OTHER PUBLICATIONS

Japanese Office Action dated Oct. 6, 2009, issued in corresponding Japanese Application No. 2007-301770, with English translation.
U.S. Application of Shimomura et al.; U.S. Appl. No. 12/274,670, filed Nov. 21, 2008.
U.S. Application of Shimomura et al.; U.S. Appl. No. 12/274,724, filed Nov. 20, 2008.

* cited by examiner

*Primary Examiner* — Thomas Denion
*Assistant Examiner* — Abdul Elnoubi
(74) *Attorney, Agent, or Firm* — Nixon & Vanderhye P.C.

(57) ABSTRACT

An exhaust emission control device reduces nitrogen oxide in exhaust air from an engine. The device includes an exhaust pipe, a catalyst, a supply device, a NOx detecting device, and a control device. The pipe defines a passage for the exhaust air. The catalyst is disposed in the pipe and promotes reduction reaction of the nitrogen oxide. The supply device supplies an additive agent, which is used for the reaction, to an upstream side of the catalyst in the exhaust air flow direction. The detecting device detects the nitrogen oxide included in the exhaust airs which has passed through the catalyst. The control device controls the supply device. The control device determines a deterioration state of the catalyst based on a result detected by the detecting device and reduces an amount of the additive agent, which is supplied, according to the determined deterioration state.

12 Claims, 5 Drawing Sheets

EXHAUST EMISSION CONTROL DEVICE

CROSS REFERENCE TO RELATED APPLICATION

This application is based on and incorporates herein by reference Japanese Patent Application No. 2007-301770 filed on Nov. 21, 2007.

BACKGROUND OF THE INVENTION

1. Field of the Invention

The present invention relates to an exhaust emission control device for reducing a nitrogen oxide included in exhaust air of an internal combustion engine such as a diesel engine, and the invention is effectively applied to vehicles.

2. Description of Related Art

According to an exhaust emission control device for reducing a nitrogen oxide (NOx) included in exhaust air of an internal combustion engine such as a diesel engine, the nitrogen oxide is purified (reduced) by providing in an exhaust pipe a catalyst that promotes a reduction reaction and by injecting an additive agent such as a urea water solution into exhaust air flowing into the catalyst (see, for example, JP2003-293739A).

More specifically, urea ($CO(NH_2)_2$) injected into exhaust air is hydrolyzed by exhaust heat ($CO(NH_2)_2 + H_2O \rightarrow 2NH_3 + CO_2$) to generate ammonia ($NH_3$), which is a reducing agent. Then, the nitrogen oxide is reduced by reaction between the nitrogen oxide and the ammonia through the catalyst.

In the above-described exhaust emission control device, the nitrogen oxide in exhaust air reacts with the ammonia through the catalyst to be turned into nitrogen ($N_2$) and water ($H_2O$). Meanwhile, when the catalyst deteriorates, reduction ability is reduced, and the nitrogen oxide is not fully reduced. Accordingly, excessive ammonia (reducing agent) is caused, and thereby the consumption of the excessive additive agent is generated.

SUMMARY OF THE INVENTION

The present invention addresses the above disadvantages. Thus, it is an objective of the present invention to prevent consumption of an excessive additive agent in an exhaust emission control device.

To achieve the objective of the present invention, there is provided an exhaust emission control device for reducing nitrogen oxide included in exhaust air from an internal combustion engine. The device includes an exhaust pipe, a catalyst, a supply means, a NOx detecting means, and a control means. The exhaust pipe defines a passage for the exhaust air discharged from the engine. The catalyst is disposed in the exhaust pipe. The catalyst is capable of promoting reduction reaction of the nitrogen oxide in the exhaust air. The supply means is for supplying an additive agent, which is used for the reduction reaction, to an upstream side of the catalyst in a flow direction of the exhaust air. The NOx detecting means is for detecting the nitrogen oxide included in the exhaust air, which has passed through the catalyst. The control means is for controlling the supply means. The control means determines a deterioration state of the catalyst based on a result detected by the NOx detecting means and reduces an amount of the additive agent, which is supplied by the supply means, in accordance with the determined deterioration state.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Embodiments are applications of an exhaust emission control device of the invention to a urea SCR (Selective Catalytic Reduction) system of a diesel engine for vehicles. The embodiments are described below with reference to the drawings.

First Embodiment

Configuration of the Exhaust Emission Control Device

Figure 1:
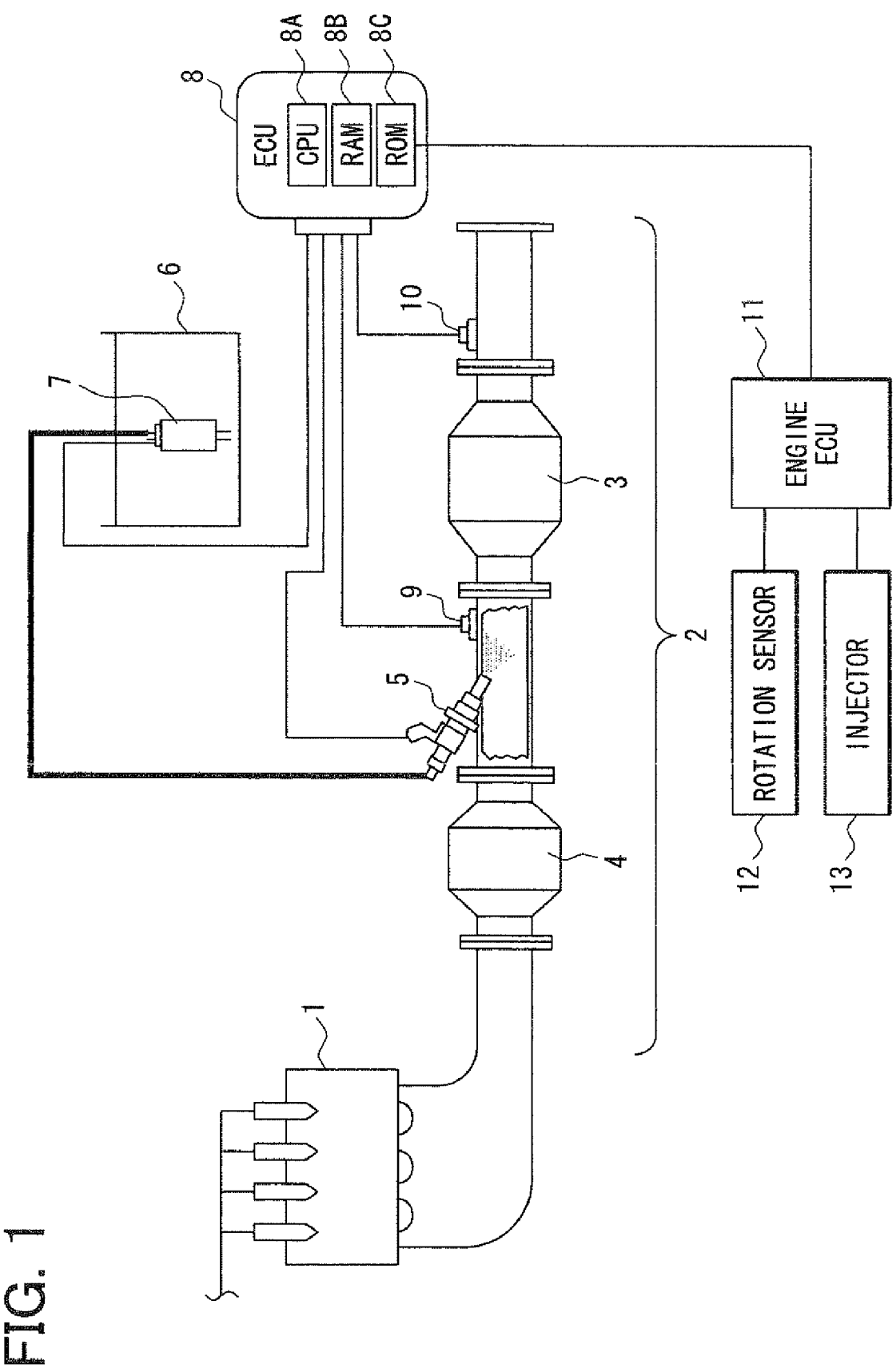
FIG. 1 is a schematic diagram illustrating an exhaust emission control device according to embodiments of the invention.

As shown in FIG. 1, an exhaust pipe 2 defines a passage for exhaust air discharged from a diesel internal combustion engine 1. An SCR catalyst 3 (hereinafter referred to as catalyst 3), which promotes reduction reaction of nitrogen oxide in exhaust air, and a DPF (Diesel Particulate Filter) 4 for capturing particulate matter such as soot contained in exhaust air are provided in the exhaust pipe 2. The DPF 4 is located on an upstream side (engine side) of the catalyst 3 in an exhaust flow direction.

A supply valve 5 is a supply means for supplying an additive agent (urea water solution in a first embodiment) used for reduction reaction into the exhaust pipe 2 from an upstream side of the catalyst 3 in a flow direction of exhaust air. An additive-agent tank 6 is a tank means for storing the additive agent supplied to the exhaust pipe 2.

An additive-agent pump 7 is a pump means for pumping the additive agent stored in the additive-agent tank 6 to the supply valve 5. Workings of the supply valve 5 and the additive-agent pump 7 are controlled by an electronic control unit (hereinafter referred to as ECU) 8.

The ECU 8 is a widely-known microcomputer including a central processing unit (CPU) 8A, a random access memory (RAM) 8B, a read-only memory (ROM) 8C and the like. A program for controlling the supply valve 5 and the like is stored in the ROM 8C of the ECU 8.

The ROM 8C is a writable non volatile semiconductor memory such as a flash memory. Therefore, the ROM 8C stores and holds information even if an electric power supply from a battery (not shown) is stopped.

An exhaust temperature sensor 9 is a temperature detecting means for detecting the temperature of exhaust air discharged from the internal combustion engine 1. A NOx sensor 10 is a NOx detecting means for detecting the nitrogen oxide included in exhaust air which has passed through the catalyst 3. In the first embodiment, the exhaust-air temperature is detected near the inlet of the catalyst 3, and the nitrogen oxide is detected near the outlet of the catalyst 3.

In addition to output signals from these two sensors 9, 10, signals indicating a rotational speed of the internal combustion engine 1 and an amount of fuel supplied to the engine 1 are inputted into the ECU 8 from an engine ECU 11, which controls the internal combustion engine 1. The ECU 8 controls the supply valve 5 and the like in accordance with these signals and the above-described program.

A detection signal by a rotation sensor 12, which detects the rotational speed of the internal combustion engine 1, is inputted into the engine ECU 11. Furthermore, the engine ECU 11 controls workings of a fuel injector 13, which injects fuel into the engine 1. Accordingly, the Engine ECU 11 calculates an amount of fuel supplied to the engine 1 based on its operation control of the fuel injector 13, to transmit a signal indicating the fuel supply amount to the ECU 8.

(Basic Workings of the Exhaust Emission Control Device)

The exhaust emission control device hydrolyzes ($CO(NH_2)_2+H_2O \rightarrow 2NH_3+CO_2$) urea ($CO(NH_2)_2$), which is the additive agent injected into exhaust air, using exhaust heat so as to generate ammonia ($NH_3$), which is a reducing agent. Then, the exhaust emission control device causes reaction between the nitrogen oxide and the ammonia through the catalyst 3 so as to purify (reduce) the nitrogen oxide.

(Characteristic Workings of the Exhaust Emission Control Device)

Figure 2:
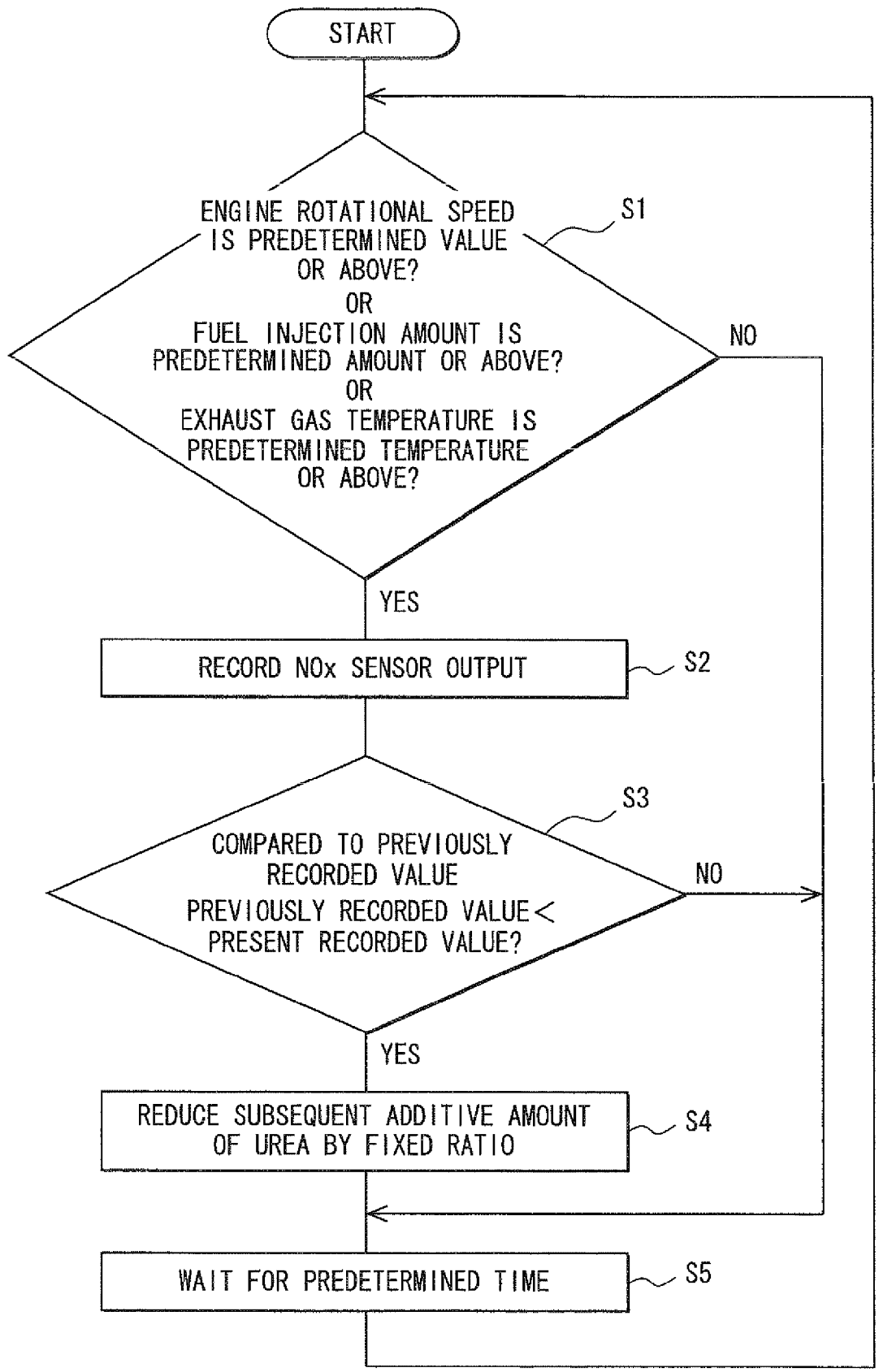
FIG. 2 is a flow chart illustrating characteristic workings of an exhaust emission control device according to a first embodiment of the invention.

As shown in FIG. 2, the control of the exhaust emission control device (the supply valve 5 and the additive-agent pump 7) is started at the same time as starting of the internal combustion engine 1. The amount of the additive agent supplied is controlled (hereinafter referred to as normal control) normally based on an amount of exhaust air discharged from the engine 1, the amount of fuel supplied to the engine 1, and the like.

The control illustrated in FIG. 2 (hereinafter referred to as catalyst deterioration determination control) is started at the same time as the normal control, and performed independently of the normal control. The catalyst deterioration determination control is performed, such that a deterioration state of the catalyst 3 is determined based on a detection result from the NOx sensor 10 and the amount of the additive agent supplied is reduced according to the determined deterioration state. The catalyst deterioration determination control is described in detail with reference to FIG. 2.

When the catalyst deterioration determination control is started, it is first determined whether or not at least one condition of the following three conditions is satisfied (S1). The three conditions are as follows: whether the rotational speed of the engine 1 is equal to or larger than a predetermined rotational speed; whether the amount of fuel supplied to the engine 1 is equal to or larger than a predetermined amount; and whether the exhaust gas temperature is equal to or larger than a predetermined temperature. The predetermined rotational speed, the predetermined amount, and the predetermined temperature vary according to displacement or specifications of the engine 1.

If it is determined that at least one condition of the above three conditions is satisfied (S1: YES), the detection result obtained from the NOx sensor 10 when it is determined that at least one condition of the above three conditions is satisfied is recorded in the ROM 8C (S2).

If it is determined that none of the above three conditions is satisfied (S1: NO), the processing S1 is performed again after a predetermined time has elapsed (S5). After the detection result from the NOx sensor 10 is recorded in the ROM 8C (S2), the detection result (hereinafter referred to as a present recorded value) obtained from the NOx sensor 10 this time, and the detection result (hereinafter referred to as a previously recorded value) obtained by the NOx sensor 10 previous time and already recorded in the ROM 8C are compared. Then, it is determined whether the present recorded value is larger than the previously recorded value (S3).

If it is determined that the present recorded value is larger than previously recorded value (S3: YES), the nitrogen oxide which is not reduced is increasing. Accordingly, the ECU 8 regards the deterioration of the catalyst 3 as progressing and reduces the amount of the additive agent supplied by a predetermined amount in the subsequent normal control (S4).

In addition, the above predetermined amount varies according to specifications of the engine 1 and the catalyst 3, and its optimum value is determined in a trial-and-error manner through experiments. If it is determined that the present recorded value is not larger than the previously recorded value (S3: NO), or after the amount of the additive agent supplied is reduced by the predetermined amount (S4), the processing S1 is performed again after the predetermined time has elapsed (S5).

(Characteristics of the Exhaust Emission Control Device of the First Embodiment)

In the first embodiment, the deterioration state of the catalyst 3 is determined based on the detection result of the NOx sensor 10, and the supply amount of the additive agent is reduced in accordance with the determined deterioration state. Accordingly, even when the catalyst 3 deteriorates and its reduction ability is reduced, the consumption of the excessive additive agent is prevented.

In the first embodiment, when at least one condition of the three conditions that the rotational speed of the engine 1 is equal to or larger than the predetermined rotational speed; that the amount of fuel supplied to the engine 1 is equal to or larger than the predetermined amount; and that the exhaust gas temperature is equal to or larger than the predetermined temperature; is satisfied, and thus the engine 1 is regarded as in continuous high-load operation, the deterioration state of the catalyst 3 is determined. Accordingly, the deterioration state of the catalyst 3 is determined on generally the same conditions. As a result, the deterioration state of the catalyst 3 is accurately determined, and therefore, the undue reduction of the supply amount of the additive agent is prevented.

In the first embodiment, the supply valve 5 corresponds to the "supply means", the NOx sensor 10 corresponds to the "NOx detecting means", and the ECU 8 corresponds to a "control means".

Furthermore, the rotation sensor 12 corresponds to a "rotational speed detecting means", the fuel injector 13 and the engine ECU 11 constitute a "supply amount detecting means", the ROM 8C corresponds to a "memory means", and the DPF 4 corresponds to a "filter".

Second Embodiment

In the first embodiment, the deterioration state of the catalyst 3 is determined when the engine 1 is regarded as in continuous high-load operation. In a second embodiment, the deterioration state of the catalyst 3 is determined when the engine 1 is regarded as in idling operation.

Figure 3:
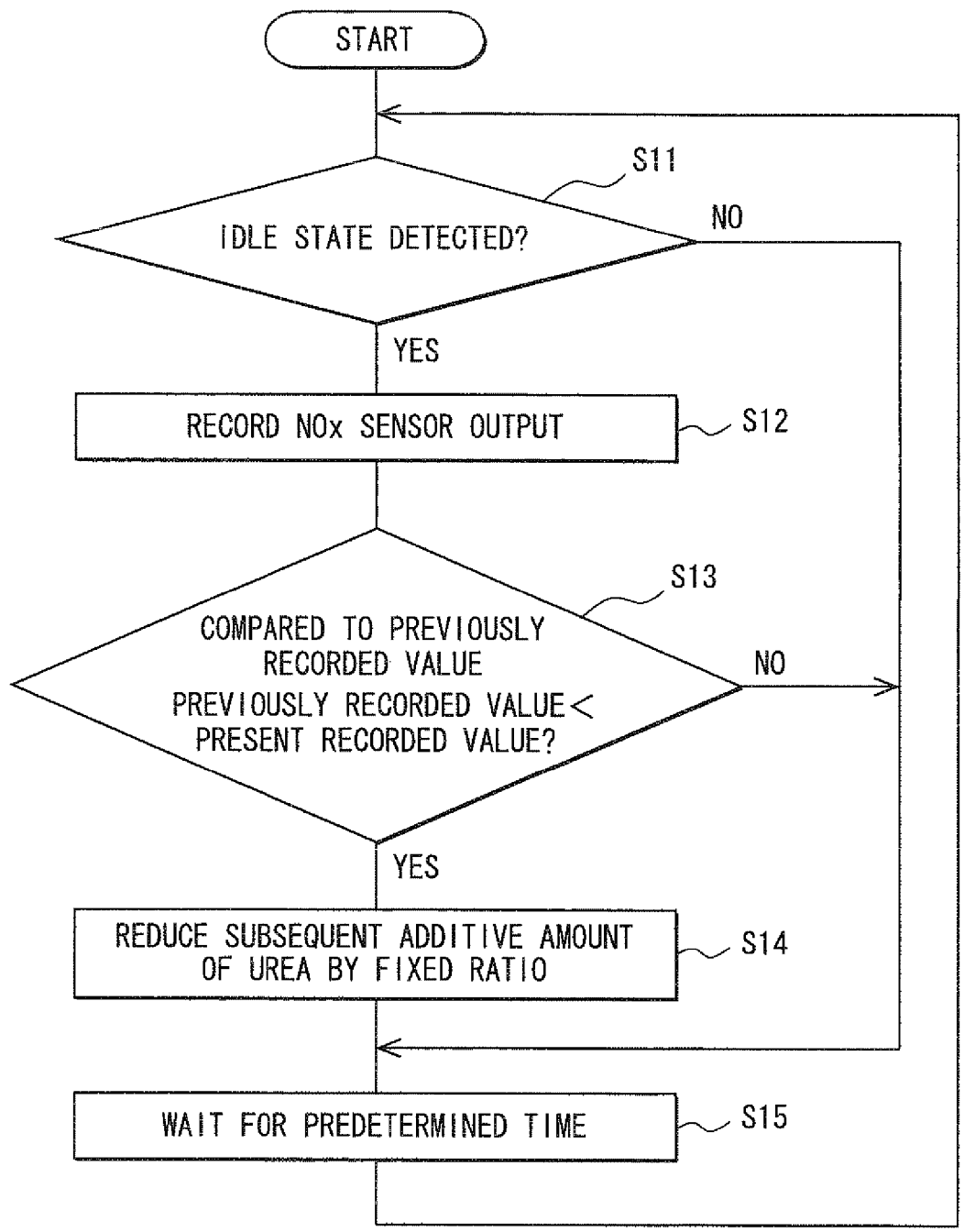
FIG. 3 is a flow chart illustrating characteristic workings of an exhaust emission control device according to a second embodiment of the invention.

FIG. 3 is a flow chart illustrating catalyst deterioration determination control of the second embodiment. The catalyst deterioration determination control of the second embodiment is described in detail with reference to FIG. 3.

When the catalyst deterioration determination control is started, it is first determined whether an internal combustion engine 1 is in an idling state, i.e., whether a rotational speed of the engine 1 is equal to or smaller than a predetermined rotational speed (S11). The above predetermined rotational speed varies according to displacement or specifications of the engine 1.

If it is determined that the engine 1 is in an idling state (S11: YES), a detection result obtained by a NOx sensor 10 when it is determined that the engine 1 is in an idling state is recorded in a ROM 8C (S12).

If it is determined that the engine 1 is not in an idling state (S11: NO), the processing S11 is performed again after the predetermined time has elapsed (S15). After the detection result obtained by the NOx sensor 10 is recorded in the ROM 8C (S12), the detection result (present recorded value) obtained by the NOx sensor 10 this time, and the detection result (previously recorded value) obtained by the NOx sensor 10 previous time and already recorded in the ROM 8C are compared, more specifically, it is determined whether the present recorded value is larger than the previously recorded value (S13).

If it is determined that the present recorded value is larger than the previously recorded value (S13: YES), the nitrogen oxide which is not reduced is increasing. Accordingly, an ECU 8 regards the deterioration of the catalyst 3 as progressing and reduces an amount of an additive agent supplied by a predetermined amount in the subsequent normal control (S14).

If it is determined that the present recorded value is not larger than the previously recorded value (S13: NO), or after the amount of the additive agent supplied is reduced by the predetermined amount (S14), the processing S11 is performed again after a predetermined time has elapsed (S15).

As described above, in the second embodiment, the deterioration state of the catalyst 3 is determined when the engine 1 is regarded as in idling operation. Therefore, the deterioration state of the catalyst 3 is determined on generally the same conditions. As a result, the deterioration state of the catalyst 3 is accurately determined, and therefore, the undue reduction of the supply amount of the additive agent is prevented.

Third Embodiment

In the first embodiment, the deterioration state of the catalyst 3 is determined when the engine 1 is regarded as in continuous high-load operation. In a third embodiment, a deterioration state of a catalyst 3 is determined when a DPF 4 is recovered.

The recovery of the DPF 4 means oxidation (combustion removal) of soot or the like, which is captured by the DPF 4, by heating the DPF 4. The recovery of the DPF 4 is normally carried out when an internal combustion engine 1 is operating.

Figure 4:
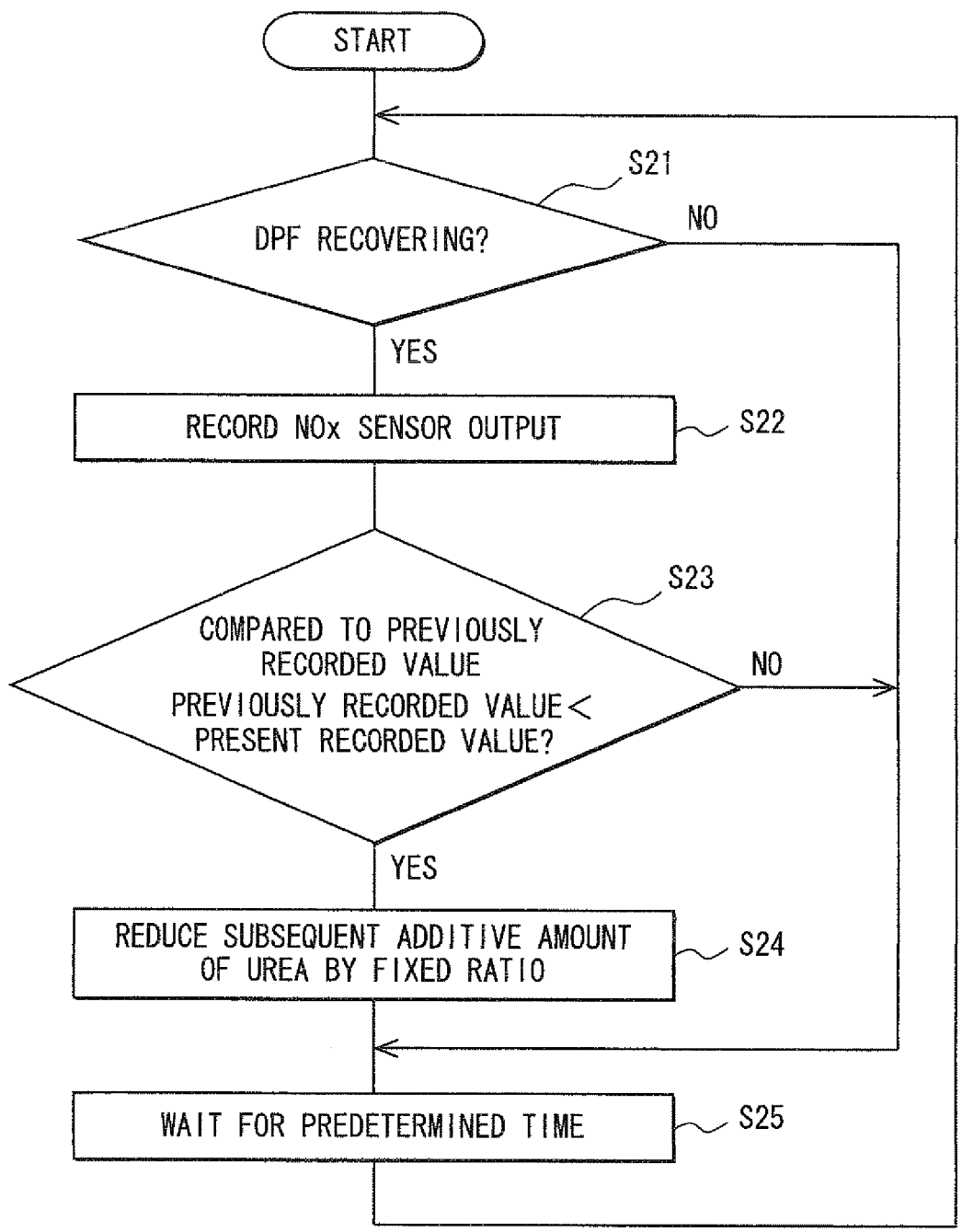
FIG. 4 is a flow chart illustrating characteristic workings of an exhaust emission control device according to a third embodiment of the invention.

FIG. 4 is a flow chart illustrating catalyst deterioration determination control of the third embodiment. The catalyst deterioration determination control of the third embodiment is described in detail with reference to FIG. 4. When the catalyst deterioration determination control is started, it is first determined whether the DPF 4 is being recovered (S21). If it is determined that the DPF 4 is being recovered (S21: YES), a detection result obtained by a NOx sensor 10 at that time is recorded in a ROM 8C (S22).

If it is determined that the DPF 4 is not being recovered (S21: NO), the processing S21 is performed again after a predetermined time has elapsed (S25). After the detection result obtained by the NOx sensor 10 is recorded in the ROM 8C (S22), the detection result (present recorded value) obtained by the NOx sensor 10 this time, and the detection result (previously recorded value) obtained by the NOx sensor 10 previous time and already recorded in the ROM 8C are compared, more specifically, it is determined whether the present recorded value is larger than the previously recorded value (S23).

If it is determined that the present recorded value is larger than the previously recorded value (S23: YES), the nitrogen oxide which is not reduced is increasing. Accordingly, an ECU 8 regards the deterioration of the catalyst 3 as progressing and reduces an amount of an additive agent supplied by a predetermined amount in the subsequent normal control (S24).

If it is determined that the present recorded value is not larger than the previously recorded value (S23: NO), or after the amount of the additive agent supplied is reduced by the predetermined amount (S24), the processing S21 is performed again after a predetermined time has elapsed (S25).

As described above, in the third embodiment, the deterioration state of the catalyst 3 is determined while the DPF 4 is being recovered. Thus, the deterioration state of the catalyst 3 is determined on generally the same conditions. As a result, the deterioration state of the catalyst 3 is accurately determined, and therefore, the undue reduction of the supply amount of the additive agent is prevented.

Fourth Embodiment

In the first embodiment, the deterioration state of the catalyst 3 is determined when the engine 1 is regarded as in continuous high-load operation. In a fourth embodiment, detection results of a NOx sensor 10 are averaged at regular time intervals, and the averaged detection result and a detection result that has been already recorded are compared to determine a deterioration state of a catalyst 3.

Figure 5:
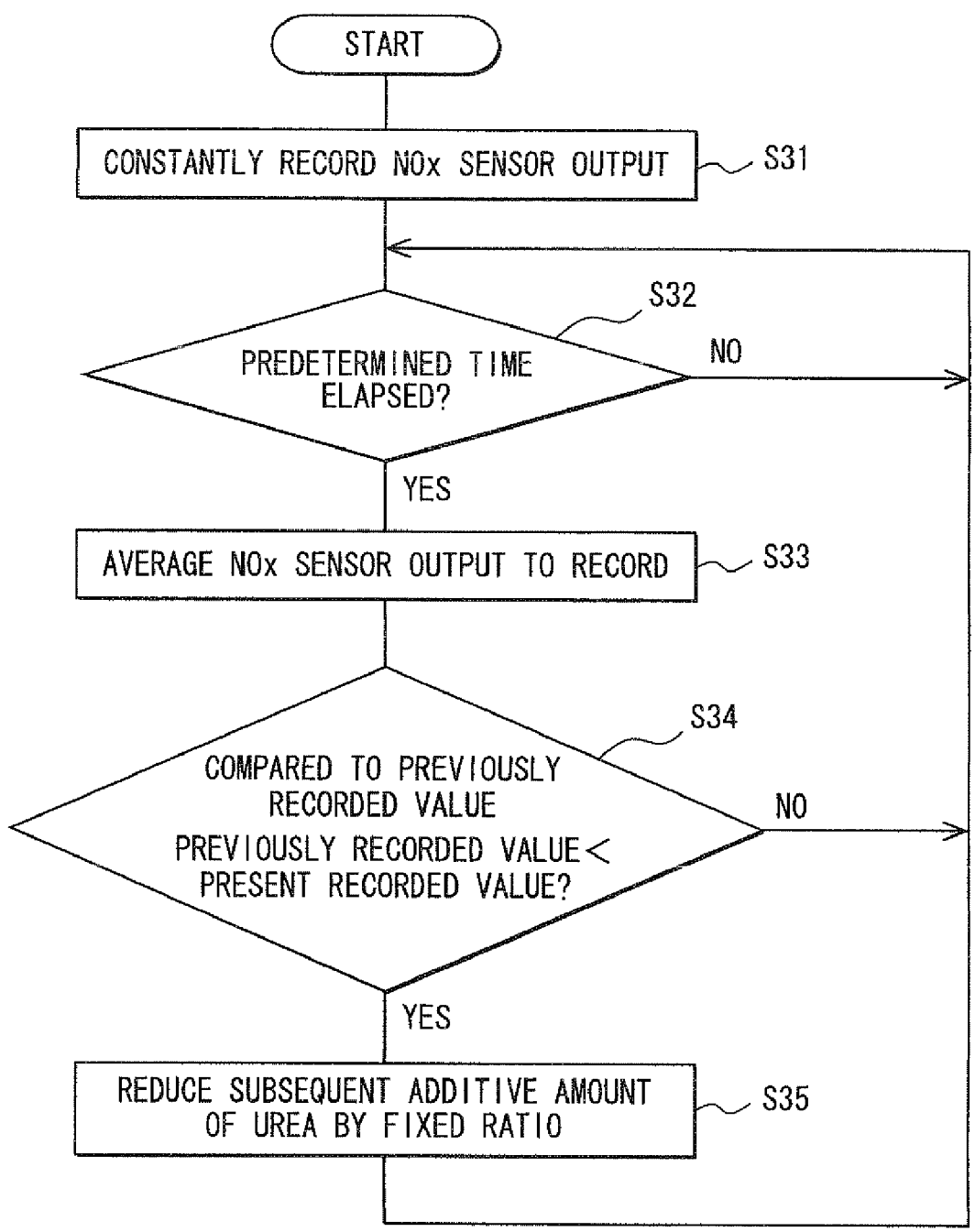
FIG. 5 is a flow chart illustrating characteristic workings of an exhaust emission control device according to a fourth embodiment of the invention.

FIG. 5 is a flow chart illustrating catalyst deterioration determination control of the fourth embodiment. The catalyst deterioration determination control of the fourth embodiment is described in detail with reference to FIG. 5. When the catalyst deterioration determination control is started, a detection value by the NOx sensor 10 is first recorded in a ROM 8C generally continuously constantly (S31). Then, it is determined whether a predetermined time has elapsed since a comparison with a previously recorded value (S32).

If it is determined that the predetermined time has not elapsed (S32: NO), the processing S32 is performed again. If it is determined that the predetermined time has elapsed (S32: YES), the detection results recorded at S31 are averaged, and then the averaged detection result is recorded in the ROM 8C (S33). In the fourth embodiment, the processing S33 corresponds to an "averaging means".

When the averaged detection result of the NOx sensor 10 is recorded in the ROM 8C (S33), the detection result (present recorded value) that is averaged this time, and the detection result (previously recorded value) that has been averaged previous time and already recorded in the ROM 8C, are compared. More specifically, it is determined whether the present recorded value is larger than the previously recorded value (S34).

If it is determined that the present recorded value is larger than the previously recorded value (S34: YES), the nitrogen oxide which is not reduced is increasing. Accordingly, an ECU 8 regards the deterioration of the catalyst 3 as progressing and reduces an amount of an additive agent supplied by a predetermined amount in the subsequent normal control (S35).

If it is determined that the present recorded value is not larger than the previously recorded value (S34: NO), or after the amount of the additive agent supplied is reduced by the predetermined amount (S35), the processing S32 is performed again.

As described above, in the fourth embodiment, the deterioration state of the catalyst 3 is determined using the detection result, which has absorbed a variation of an operation condition of the engine 1. Accordingly, the deterioration state of the catalyst 3 is accurately determined, and the undue reduction of the supply amount of the additive agent is prevented.

Other Embodiments

In the above embodiment, urea is used as an additive agent. However, the invention is not limited to the above. That is, a reducing agent other than ammonia, or an additive agent that generates this reducing agent may be used.

The invention is not limited to the above-described embodiments. For example, at least two embodiments of the first to fourth embodiments may be combined.

Additional advantages and modifications will readily occur to those skilled in the art. The invention in its broader terms is therefore not limited to the specific details, representative apparatus, and illustrative examples shown and described.

What is claimed is:

1. An exhaust emission control device for reducing nitrogen oxide included in exhaust air from an internal combustion engine, the device comprising:
   an exhaust pipe defining a passage for the exhaust air discharged from the engine;
   a catalyst disposed in the exhaust pipe, the catalyst being capable of promoting reduction reaction of the nitrogen oxide in the exhaust air;
   a supply unit for supplying an additive agent, which is used for the reduction reaction, to an upstream side of the catalyst in a flow direction of the exhaust air;
   a NOx detecting unit for detecting the nitrogen oxide included in the exhaust air, which has passed through the catalyst;
   a control unit having a program for controlling the supply unit, wherein the control unit determines a deterioration state of the catalyst based on a result detected by the NOx detecting unit and reduces an amount of the additive agent, which is supplied by the supply unit, in accordance with the determined deterioration state;
   a rotational speed detecting unit for detecting a rotational speed of the engine;
   a supply amount detecting unit for detecting an amount of fuel supplied to the engine;
   a temperature detecting unit for detecting temperature of the exhaust air discharged from the engine; and
   a memory unit for storing the result detected by the NOx detecting unit, wherein:
      the control unit makes the memory unit store the result, which is detected by the NOx detecting unit when at least one of the following conditions is satisfied and accordingly the engine is regarded as in continuous high-load operation:
         the rotational speed of the engine is equal to or larger than a predetermined rotational speed;
         the amount of fuel supplied to the engine is equal to or larger than a predetermined amount; and
         the temperature of the exhaust air is equal to or larger than a predetermined temperature; and
      the control unit determines the deterioration state of the catalyst by comparing the result, which is detected by the NOx detecting unit when the engine is regarded as in continuous high-load operation, and the result detected by the NOx detecting unit and already stored in the memory unit.

2. The exhaust emission control device according to claim 1, wherein:
   the control unit makes the memory unit store the result, which is detected by the NOx detecting unit when the rotational speed of the engine is equal to or smaller than a predetermined rotational speed and accordingly the engine is regarded as in idling operation; and
   the control unit determines the deterioration state of the catalyst by comparing the result, which is detected by the NOx detecting unit when the engine is regarded as in idling operation, and the result detected by the NOx detecting unit and already stored in the memory unit.

3. The exhaust emission control device according to claim 1, further comprising:
   a filter disposed on the upstream side of the catalyst in the flow direction of the exhaust air and configured to capture particles in the exhaust air; wherein:
      the control unit makes the memory unit store the result, which is detected by the NOx detecting unit while the filter is being recovered by heating the filter; and
      the control unit determines the deterioration state of the catalyst by comparing the result, which is detected by the NOx detecting unit while the filter is being recovered, and the result detected by the NOx detecting unit and already stored in the memory unit.

4. The exhaust emission control device according to claim 1, further comprising:
   an averaging unit for averaging a plurality of detection results obtained by the NOx detecting unit to output an averaged detection result; and
   a memory unit for storing the averaged detection result obtained by the averaging unit, wherein when the averaged detection result is outputted by the averaging unit, the control unit determines the deterioration state of the catalyst by comparing the averaged detection result that is outputted, and the averaged detection result that has already been stored in the memory unit.

5. An exhaust emission control device for reducing nitrogen oxide included in exhaust air from an internal combustion engine, the device comprising:
   an exhaust pipe defining a passage for the exhaust air discharged from the engine;
   a catalyst disposed in the exhaust pipe, the catalyst being capable of promoting reduction reaction of the nitrogen oxide in the exhaust air;
   a supply unit for supplying an additive agent, which is used for the reduction reaction, to an upstream side of the catalyst in a flow direction of the exhaust air;
   a NOx detecting unit for detecting the nitrogen oxide included in the exhaust air, which has passed through the catalyst;
   a control unit having a program for controlling the supply unit, wherein the control unit determines a deterioration state of the catalyst based on a result detected by the NOx detecting unit and reduces an amount of the additive agent, which is supplied by the supply unit, in accordance with the determined deterioration state;
   a rotational speed detecting unit for detecting a rotational speed of the engine; and
   a memory unit for storing the result detected by the NOx detecting unit, wherein:

the control unit makes the memory unit store the result, which is detected by the NOx detecting unit when the rotational speed of the engine is equal to or smaller than a predetermined rotational speed and accordingly the engine is regarded as in idling operation; and the control unit determines the deterioration state of the catalyst by comparing the result, which is detected by the NOx detecting unit when the engine is regarded as in idling operation, and the result detected by the NOx detecting unit and already stored in the memory unit.

6. The exhaust emission control device according to claim 5, further comprising:

a supply amount detecting unit for detecting an amount of fuel supplied to the engine; and a temperature detecting unit for detecting temperature of the exhaust air discharged from the engine; wherein:

the control unit makes the memory unit store the result, which is detected by the NOx detecting unit when at least one of the following conditions is satisfied and accordingly the engine is regarded as in continuous high-load operation:

the rotational speed of the engine is equal to or larger than a predetermined rotational speed;

the amount of fuel supplied to the engine is equal to or larger than a predetermined amount; and the temperature of the exhaust air is equal to or larger than a predetermined temperature; and the control unit determines the deterioration state of the catalyst by comparing the result, which is detected by the NOx detecting unit when the engine is regarded as in continuous high-load operation, and the result detected by the NOx detecting unit and already stored in the memory unit.

7. The exhaust emission control device according to claim 5, further comprising:

a filter disposed on the upstream side of the catalyst in the flow direction of the exhaust air and configured to capture particles in the exhaust air; wherein:

the control unit makes the memory unit store the result, which is detected by the NOx detecting unit while the filter is being recovered by heating the filter; and the control unit determines the deterioration state of the catalyst by comparing the result, which is detected by the NOx detecting unit while the filter is being recovered, and the result detected by the NOx detecting unit and already stored in the memory unit.

8. The exhaust emission control device according to claim 5, further comprising:

an averaging unit for averaging a plurality of detection results obtained by the NOx detecting unit to output an averaged detection result; and a memory unit for storing the averaged detection result obtained by the averaging unit, wherein when the averaged detection result is outputted by the averaging unit, the control unit determines the deterioration state of the catalyst by comparing the averaged detection result that is outputted, and the averaged detection result that has already been stored in the memory unit.

9. An exhaust emission control device for reducing nitrogen oxide included in exhaust air from an internal combustion engine, the device comprising:

an exhaust pipe defining a passage for the exhaust air discharged from the engine;

a catalyst disposed in the exhaust pipe, the catalyst being capable of promoting reduction reaction of the nitrogen oxide in the exhaust air;

a supply unit for supplying an additive agent, which is used for the reduction reaction, to an upstream side of the catalyst in a flow direction of the exhaust air;

a NOx detecting unit for detecting the nitrogen oxide included in the exhaust air, which has passed through the catalyst;

a control unit having a program for controlling the supply unit, wherein the control unit determines a deterioration state of the catalyst based on a result detected by the NOx detecting unit and reduces an amount of the additive agent, which is supplied by the supply unit, in accordance with the determined deterioration state;

a filter disposed on the upstream side of the catalyst in the flow direction of the exhaust air and configured to capture particles in the exhaust air; and a memory unit for storing the result detected by the NOx detecting unit, wherein:

the control unit makes the memory unit store the result, which is detected by the NOx detecting unit while the filter is being recovered by heating the filter; and the control unit determines the deterioration state of the catalyst by comparing the result, which is detected by the NOx detecting unit while the filter is being recovered, and the result detected by the NOx detecting unit and already stored in the memory unit.

10. The exhaust emission control device according to claim 9, further comprising:

a rotational speed detecting unit for detecting a rotational speed of the engine;

a supply amount detecting unit for detecting an amount of fuel supplied to the engine; and a temperature detecting unit for detecting temperature of the exhaust air discharged from the engine; wherein:

the control unit makes the memory unit store the result, which is detected by the NOx detecting unit when at least one of the following conditions is satisfied and accordingly the engine is regarded as in continuous high-load operation:

the rotational speed of the engine is equal to or larger than a predetermined rotational speed;

the amount of fuel supplied to the engine is equal to or larger than a predetermined amount; and the temperature of the exhaust air is equal to or larger than a predetermined temperature; and the control unit determines the deterioration state of the catalyst by comparing the result, which is detected by the NOx detecting unit when the engine is regarded as in continuous high-load operation, and the result detected by the NOx detecting unit and already stored in the memory unit.

11. The exhaust emission control device according to claim 9, further comprising:

a rotational speed detecting unit for detecting a rotational speed of the engine; wherein:

the control unit makes the memory unit store the result, which is detected by the NOx detecting unit when the rotational speed of the engine is equal to or smaller than a predetermined rotational speed and accordingly the engine is regarded as in idling operation; and the control unit determines the deterioration state of the catalyst by comparing the result, which is detected by the NOx detecting unit when the engine is regarded as in idling operation, and the result detected by the NOx detecting unit and already stored in the memory unit.

12. The exhaust emission control device according to claim 9, further comprising:

an averaging unit for averaging a plurality of detection results obtained by the NOx detecting unit to output an averaged detection result; and a memory unit for storing the averaged detection result obtained by the averaging unit, wherein when the averaged detection result is outputted by the averaging unit, the control unit determines the deterioration state of the catalyst by comparing the averaged detection result that is outputted, and the averaged detection result that has already been stored in the memory unit.

* * * * *

UNITED STATES PATENT AND TRADEMARK OFFICE
CERTIFICATE OF CORRECTION

PATENT NO. : 8,146,348 B2
APPLICATION NO. : 12/274698
DATED : April 3, 2012
INVENTOR(S) : Shimomura et al.

Page 1 of 1

It is certified that error appears in the above-identified patent and that said Letters Patent is hereby corrected as shown below:

On the Title page, Item (73) Assignee should read:  Denso Corporation, Kariya (JP)

Nippon Soken, Inc., Nishio (JP)

Signed and Sealed this
Seventeenth Day of July, 2012

David J. Kappos
*Director of the United States Patent and Trademark Office*